United States Patent
Suwa et al.

(10) Patent No.: US 7,223,439 B2
(45) Date of Patent: May 29, 2007

(54) METHOD FOR MANUFACTURING MAGNETIC RECORDING MEDIUM AND MAGNETIC RECORDING MEDIUM

(75) Inventors: Takahiro Suwa, Chuo-ku (JP);
Mitsuru Takai, Chuo-ku (JP);
Kazuhiro Hattori, Chuo-ku (JP)

(73) Assignee: TDK Corporation, Tokyo (JP)

( * ) Notice: Subject to any disclaimer, the term of this patent is extended or adjusted under 35 U.S.C. 154(b) by 258 days.

(21) Appl. No.: 10/805,434

(22) Filed: Mar. 22, 2004

(65) Prior Publication Data
US 2004/0191577 A1 Sep. 30, 2004

(30) Foreign Application Priority Data
Mar. 26, 2003 (JP) ............................. 2003-086019

(51) Int. Cl.
*B05D 5/12* (2006.01)
(52) U.S. Cl. .................. 427/127; 427/128; 427/130; 427/131
(58) Field of Classification Search ............... 427/127, 427/128, 130, 131
See application file for complete search history.

(56) References Cited

U.S. PATENT DOCUMENTS 6,635,184 B1 * 10/2003 Cohen et al. ................. 216/22

2004/0010979 A1 * 1/2004 Oshima et al. ............... 51/307

FOREIGN PATENT DOCUMENTS

| JP | A 3-129731 | 6/1991 |
|----|------------|--------|
| JP | A 3-147322 | 6/1991 |
| JP | A 8-222554 | 8/1996 |
| JP | A 8-253881 | 10/1996 |
| JP | A 9-97419 | 4/1997 |
| JP | A 11-121523 | 4/1999 |
| JP | A 2000-91290 | 3/2000 |
| JP | A 2000-322710 | 11/2000 |

* cited by examiner

*Primary Examiner*—Alain L. Bashore
(74) *Attorney, Agent, or Firm*—Oliff & Berridge, PLC

(57) ABSTRACT

A magnetic recording medium and a method for manufacturing the same are provided, which provide high surface recording density and high recording/reading performance. The magnetic recording medium is manufactured by forming an intermediate protective layer between a continuous recording layer and a first mask layer, dividing the continuous recording layer to form divided recording elements, and then removing the first mask layer while leaving the intermediate protective layer on the top of the divided recording elements. Further, gaps between the divided recording elements are filled with a non-magnetic material before removing the first mask layer.

17 Claims, 9 Drawing Sheets

METHOD FOR MANUFACTURING MAGNETIC RECORDING MEDIUM AND MAGNETIC RECORDING MEDIUM

BACKGROUND OF THE INVENTION

1. Field of the Invention

The present invention relates to a method for manufacturing a magnetic recording medium and to a magnetic recording medium.

2. Description of the Related Arts

In the field of magnetic recording media such as hard discs, the surface recording density has been increased remarkably by various technical improvements, for example, by making magnetic particles, which constitute the recording layer, finer, changing materials to more effective ones, sophisticating the head processing, and so on, and further improvement of the surface recording density is still expected.

However, the improvement of the surface recording density by such conventional methods as making magnetic particles finer has already reached the limit. A discrete type magnetic recording medium is now proposed as a novel magnetic recording medium expected to be capable of further improving the surface recording density. The discrete type magnetic recording medium is produced by dividing a continuous recording layer into a number of divided recording elements, and filling the gaps between these divided recording elements with a non-magnetic material (see Japanese Patent Laid-Open Publication No. Hei 9-97419, for example).

An example of processing techniques capable of achieving minute division of a continuous recording layer is a dry etching process, such as a reactive ion etching process in which CO (carbon monoxide) gas with a nitrogen based compound gas such as $NH_3$ (ammonia) gas added is used as the reactive gas (see Japanese Patent Laid-Open Publication No. H 12-322710, for example). More specifically, a mask layer is formed in a predetermined pattern on the surface of a continuous recording layer, removing the part of the continuous recording layer exposed from the mask layer by the aforementioned dry etching process using CO gas and so on as a reactive gas, and thereby dividing the continuous recording layer into a number of divided recording elements.

The mask layer left on the divided recording elements can be removed by a reactive ion etching process or the like using a chemically active gas as a reactive gas. The chemically active gas may be a gas commonly used in the field of semiconductor manufacturing, for example, fluorine-based gas such as $SF_6$ (sulfur hexafluoride), $CF_4$ (carbon tetrafluoride), $NF_3$ (nitrogen trifluoride), or $CHF_3$ (fluoroform), and chlorine-based gas such as $Cl_2$ (chlorine), $BCl_3$ (boron trichloride), or $CHCl_3$ (chloroform).

In order to achieve stable flying of head, it is preferable to process and flatten the surfaces of a non-magnetic material and divided recording elements so that the surface roughness is limited to a certain degree. Processing techniques used in the field of semiconductor manufacturing, such as wet-process CMP (Chemical Mechanical Polishing) may be used for such flattening processing.

However, when the mask layer is removed from the divided recording elements using a reactive gas with strong chemical activity such as $SF_6$ or $CF_4$, a region around the top face and side face of the divided recording elements is apt to be subjected to deterioration such as oxidation, corrosion, or the like.

Also when a CMP process or the like is used for processing the surface of the divided recording elements and non-magnetic material, regions around the top face and side face of the divided recording elements are apt to be chemically and physically influenced by slurry or the like, and are often subjected to deterioration such as corrosion.

Further, such deterioration of the divided recording elements may occur with time after the processing.

Such deterioration of the divided recording elements may deteriorate the magnetic properties and hence decrease the recording/reading performance of the magnetic recording medium.

In other words, since magnetic recording media have peculiar problems such as their magnetic material being prone to oxidize and so on, it has been difficult to manufacture a discrete type magnetic recording media affording high recording/reading performance while reliably preventing the deterioration of divided recording elements, by directly applying a conventional processing method, that might be very effective in the field of semiconductor manufacturing.

SUMMARY OF THE INVENTION

In view of the foregoing problems, various exemplary embodiments of this invention provide a method for manufacturing a magnetic recording medium having high surface recording density and high recording/reading performance, and provide such magnetic recording medium.

Various exemplary embodiments of the invention achieve the object by forming an intermediate protective layer between a continuous recording layer and a mask layer, dividing the continuous recording layer into divided recoding elements, and then removing the mask layer such that the intermediate protective layer is left on the divided recording elements, so that the region around the top face of the divided recoding elements is separated from a reactive gas or the like by the intermediate protective layer and the divided recording elements are thereby prevented from deterioration that might occur in such region.

On the other hand, various exemplary embodiments of the invention achieve the object by filling the gaps between the divided recording elements with a non-magnetic material, and then removing the mask layer so that a region around the side faces of the divided recording elements is separated from a reactive gas or the like by the non-magnetic material and the divided recording elements are thus prevented from deterioration that might occur in such region.

It is preferable, in order to prevent both the regions around the top face and side faces of the divided recording elements from deterioration, to take both the measures, namely, forming an intermediate protective layer between the continuous recording layer and the mask layer, and removing the mask layer after filling the gaps between the divided recording elements with a non-magnetic material.

Accordingly, various exemplary embodiments of the invention provide a method for manufacturing a magnetic recording medium comprising:

a continuous recording layer formation step of forming a continuous recording layer on a surface of a substrate;

an intermediate protective layer formation step of forming an intermediate protective layer on the continuous recording layer;

a mask layer formation step of forming a mask layer on the intermediate protective layer;

a mask layer processing step of partially removing the intermediate protective layer together with the mask layer in a predetermined pattern;

a continuous recording layer processing step of removing a part of the continuous recording layer exposed from the mask layer to divide the continuous recording layer into a number of divided recording elements in the predetermined pattern; and a mask layer removing step of removing the mask layer on the top of the intermediate protective layer while leaving the intermediate protective layer on the top of each of the divided recording elements, the continuous recording layer processing step and the mask layer removing step being performed in this order.

a method for manufacturing a magnetic recording medium comprising:

a continuous recording layer formation step of forming a continuous recording layer on a surface of a substrate;

a mask layer formation step of forming a mask layer on the continuous recording layer;

a mask layer processing step of partially removing the mask layer in a predetermined pattern;

a continuous recording layer processing step of removing a part of the continuous recording layer exposed from the mask layer to divide the continuous recording layer into a number of divided recording elements in the predetermined pattern;

a non-magnetic material filling step of filling gaps between the divided recording elements with a non-magnetic material; and a mask layer removing step of removing the mask layer remaining on the divided recording elements, the continuous recording layer processing step, the non-magnetic material filling step, and the mask layer removing step being performed in this order.

a magnetic recording medium comprising:

a divided recording layer divided into a number of minute divided recording elements; and a non-magnetic material with which gaps between the divided recording elements are filled, wherein there is a step between the surface of the divided recording elements and the surface of the non-magnetic material.

In the present specification, the term "diamond-like carbon" (to be abbreviated as "DLC") shall be used to mean a material that is principally composed of carbon, has an amorphous structure, and exhibits a hardness of about 200 to 8000 (kgf/mm$^2$) measured by a Vickers hardness test.

Also, in the present specification, the term "incident angle" of ions as used in relation to a dry etching process using plasma shall mean an incident angle formed with respect to the surface of a magnetic recording medium, that is an angle formed between the surface of the recording medium and the central axis of an incident ion beam. For example, if the central axis of an ion beam is parallel to the surface of the recording medium, the incident angle is zero degrees.

Further, in the present specification, a step formed between a non-magnetic material and divided recording elements shall be expressed by a positive value if the surface of the non-magnetic material is higher (the non-magnetic material projects), while by a negative value if the surface of the non-magnetic material is lower (the non-magnetic material is depressed). For example, a step height of −15 nm means that the surface of the non-magnetic material is lower, in other words closer to the substrate, than the recording surface of the divided recording elements by 15 nm.

DETAILED DESCRIPTION OF THE PREFERRED EMBODIMENTS

Now, a preferred embodiment of the present invention will be described in a detailed manner with reference to the attached drawings.

Figure 1:
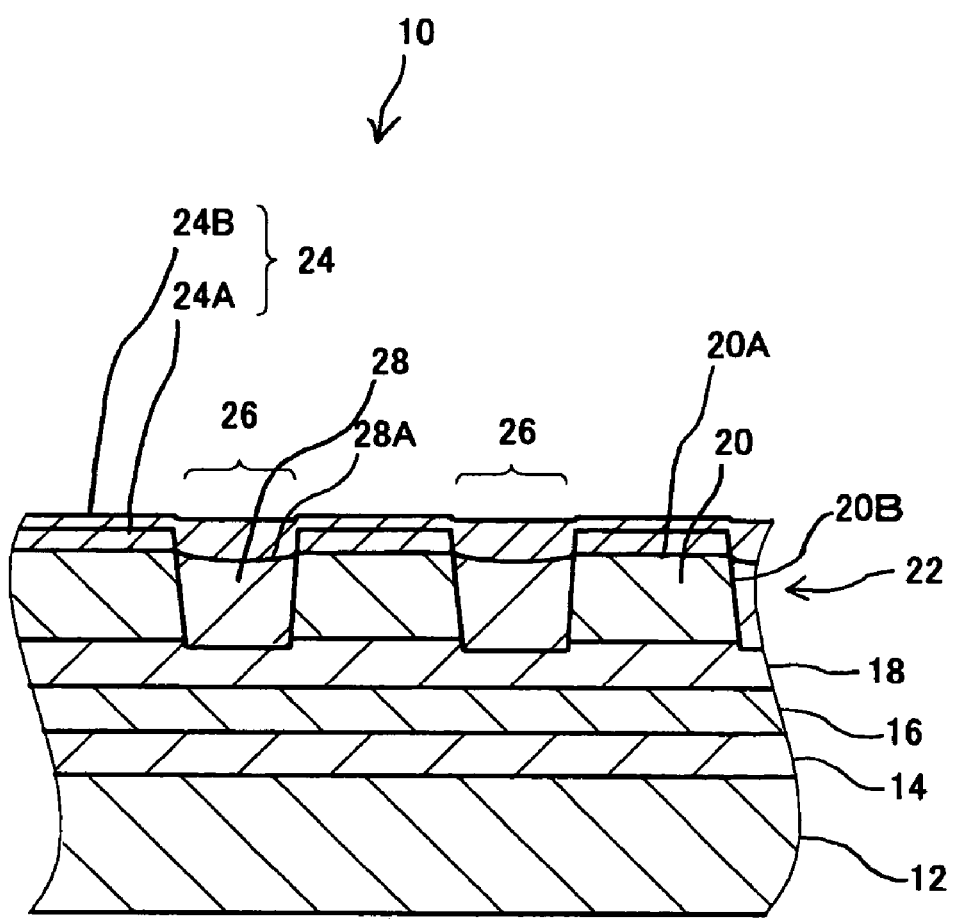
FIG. 1 is a side sectional view schematically showing a structure of a magnetic recording medium according to an embodiment of the present invention.

FIG. 1 is a side sectional view showing schematically a structure of a magnetic recording medium according to an embodiment of the present invention.

A magnetic recording medium 10 is of a discrete, vertical recording type, and comprises a substrate 12, on which an underlayer 14, a soft magnetic layer 16, an seed layer 18, a divided recording layer 22 that includes a number of minute divided recording elements 20, and a protective layer 24 are formed sequentially in this order. Gaps 26 between the divided recording elements 22 are filled with a non-magnetic material 28.

The substrate 12 is made of glass, the underlayer 14 is made of Cr (chromium) or a Cr alloy, the soft magnetic layer 16 is made of an Fe (iron) alloy or Co (cobalt) alloy, and the seed layer 18 is made of CoO, MgO, NiO or the like.

The divided recording elements 20 constituting the divided recording layer 22 are made of Co alloys including Co (cobalt) CoCrPt (cobalt-chromium-platinum). The top face 20A of each of the divided recording elements 20 is coated with a protective layer 24 and the side face 20B thereof is coated with the non-magnetic material 28.

The protective layer 24 is constituted by an intermediate protective layer 24A formed on the top face 20A of the divided recording element 20, and a surface protective layer 24B formed over the intermediate protective layer 24A and the non-magnetic material 28. These intermediate protective layer 24A and surface protective layer 24B are commonly made of DLC and are integrated together.

The non-magnetic material 28 is made of $SiO_2$ (silicon dioxide) and is deposited to fill the gap 26 such that the surface 28A is situated higher or lower than the surface 20A of the divided recording element 20 in the thickness direction (namely, the surface 28A is projected or depressed).

Now, the operation of the magnetic recording medium 10 will be described below.

The magnetic recording medium 10 is of a discrete, vertical recording type in which the divided recording layer 22 including a number of minute divided recording elements 20. Therefore it is difficult to cause a recording or reading error between the recording elements 20, and a high surface recording density can be attained.

Further, when the surface 28A of the non-magnetic material 28 is located-lower than the surface 20A of the divided recording elements 20 in the thickness direction of the layers, the magnetism between a head (not shown) and the magnetic recording medium 10 is directed to the divided recording elements 20 more selectively by that much, and hence the recording/reading performance can be improved by that much.

On the other hand, when the surface 20A of the divided recording elements 20 is located lower than the surface 28A of the non-magnetic material 28 in the thickness direction of the layers, the surface 20A of the divided recording elements 20 will not touch the head (not shown) even if the head touches the surface of the magnetic recording medium 10, and hence an effect of preventing damage to recorded data can be obtained.

Additionally, the surface protective layer 24B is further formed over the intermediate protective layer 24A and the non-magnetic material 28, whereby the absolute value of the step height in the surface of the surface protective layer 24B is made smaller than the absolute value of the step height between the divided recording elements 20 and the non-magnetic material 28, and hence it is possible to achieve stable flying of the head (not shown).

Further, each of the divided recording elements 20 is coated with the intermediate protective layer 24A at the top face 20A and coated with the non-magnetic material 28 at the side faces 20B, whereby the divided recording elements 20 are separated from the atmosphere or the like, and therefore they are difficult to deteriorate and can keep the magnetic properties stably. As a result, the magnetic recording medium 10 can provide a high reliability.

Next, a method for manufacturing the magnetic recording. medium 10 will be described.

Figure 2:
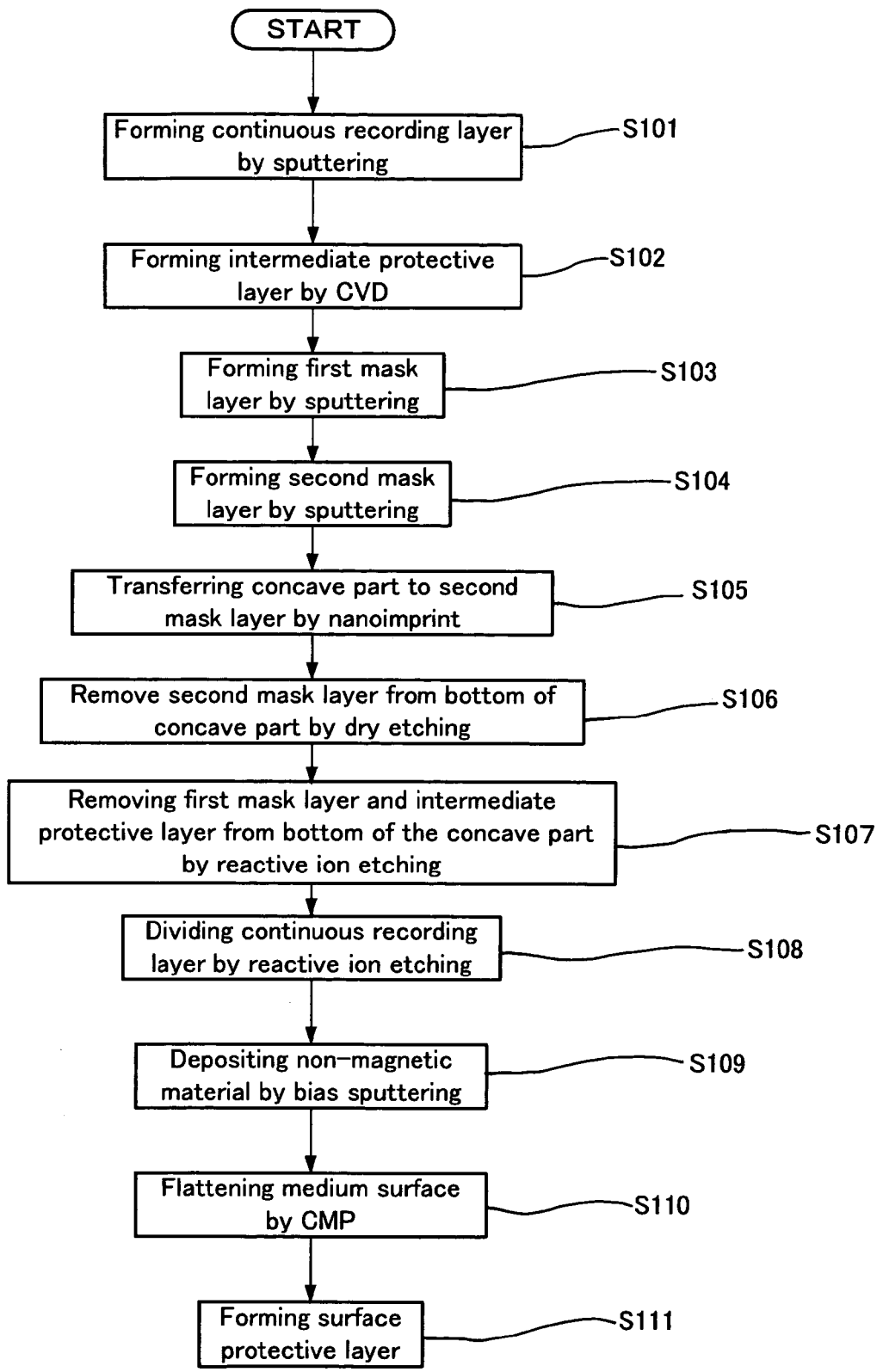
FIG. 2 is a flow chart showing the steps for manufacturing the recording magnetic medium according to the embodiment of the present invention.

FIG. 2 is a flow chart showing the outline of the steps for manufacturing the magnetic recording medium 10.

Figure 3:
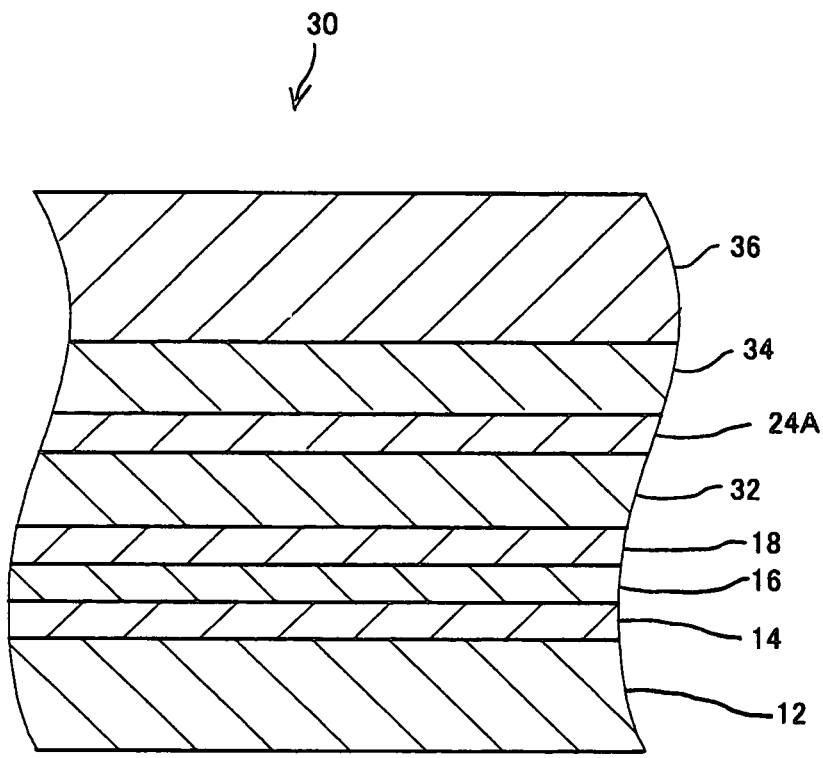
FIG. 3 is a side sectional view schematically showing a structure of an intermediate product for the magnetic recording medium.

Firstly, an intermediate product 30 as shown in FIG. 3 is prepared in the manufacturing process. There are formed on a substrate 12, an underlayer 14 to a thickness of 300 to 2000 Å, a soft magnetic layer 16 to a thickness of 500 to 3000 Å, an seed layer 18 to a thickness of 30 to 300 Å, and a continuous recording layer 32 to a thickness of 100 to 300 Å in this order by a sputtering method (S101) Further, an intermediate protective layer 24A is formed to a thickness of 10 to 50 Å by a CVD method (S102). A first mask layer 34 is then formed on the intermediate protective layer 24A to a thickness of 100 to 500 Å by a sputtering method (S103), and further a second mask layer 36 is formed thereon to a thickness of 300 to 3000 Å by a spin coating or dipping method (S104). The structure thus formed is baked to obtain the intermediate product 30.

The first mask layer 34 is made of TiN (titanium nitride), and the second mask layer 36 is made of a negative-type resist (NEB22A manufactured by Sumitomo Chemical Co., Ltd.).

Figure 4:
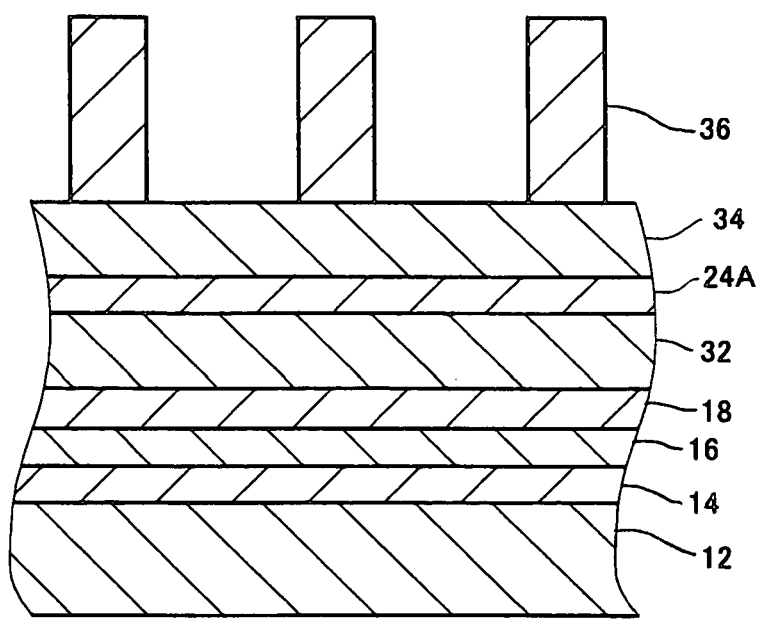
FIG. 4 is a side sectional view schematically showing the shape of the intermediate product in which a second mask layer has been divided.

A concave part corresponding to the pattern for dividing the divided recording layer 22 is transferred onto the second mask layer 36 of the intermediate product 30 by using transfer means (not shown) by a nanoimprint technique (S105). Further, the entire surface of the second mask layer 36 is uniformly dry etched by means of plasma produced from oxygen or ozone gas, whereby the second mask layer 36 is removed from the bottom of the concave parts as shown in FIG. 4 (S106) and the first mask layer 34 is exposed at the bottom of the concave parts. While some of the second mask layer 36 will be removed by the dry etching from the region other than the concave parts too, the second mask layer 36 is left as high as a step with respect to the bottom of the concave parts.

Figure 5:
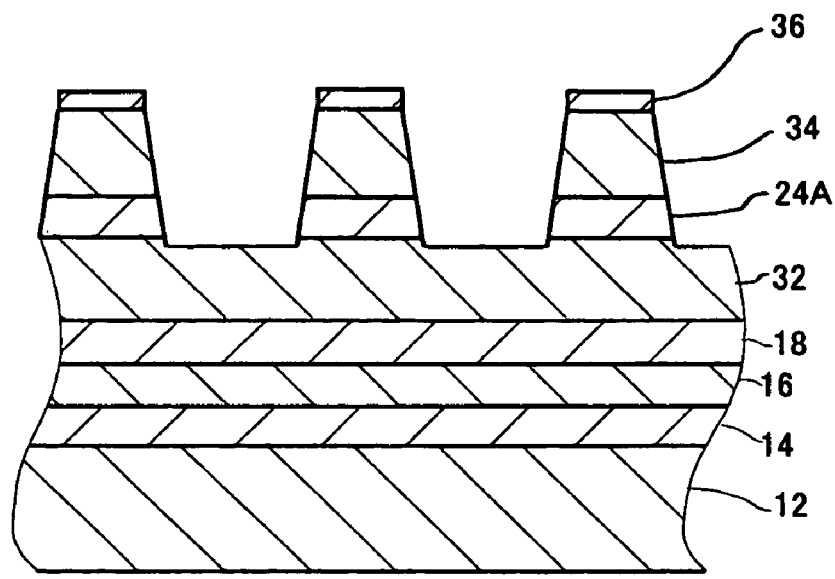
FIG. 5 is a side sectional view schematically showing the shape of the intermediate product in which a first mask layer and intermediate protective layer have been divided.

Next, as shown in FIG. 5, the first mask layer 34 is removed from the bottom of the concave parts by the reactive ion etching using $CF_4$ or $SF_6$ gas as a reactive gas (S107). During this process, the intermediate layer 24A is also removed from the bottom of the concave parts, and a small amount of the continuous recording layer 32 is also removed. The second mask layer 36 in the region other than the concave parts is also mostly removed while leaving a small amount.

Figure 6:
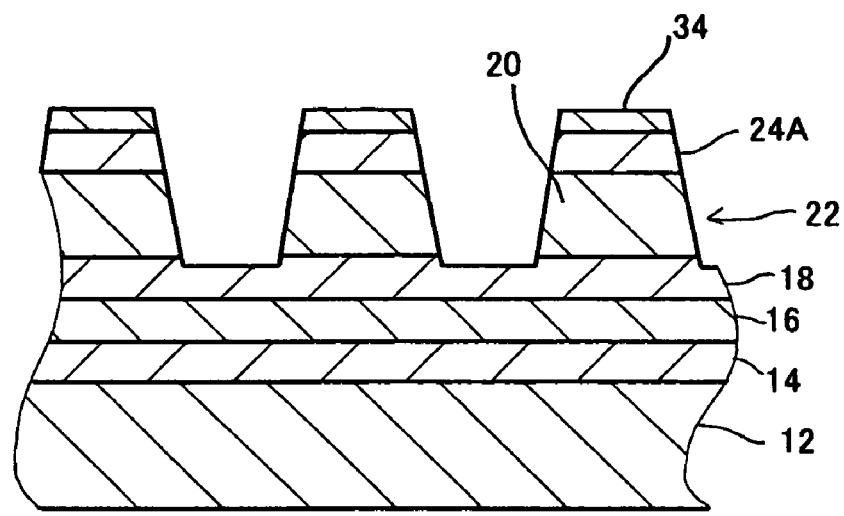
FIG. 6 is a side sectional view schematically showing the shape of the intermediate product in which a continuous recording layer has been divided.
Figure 7:
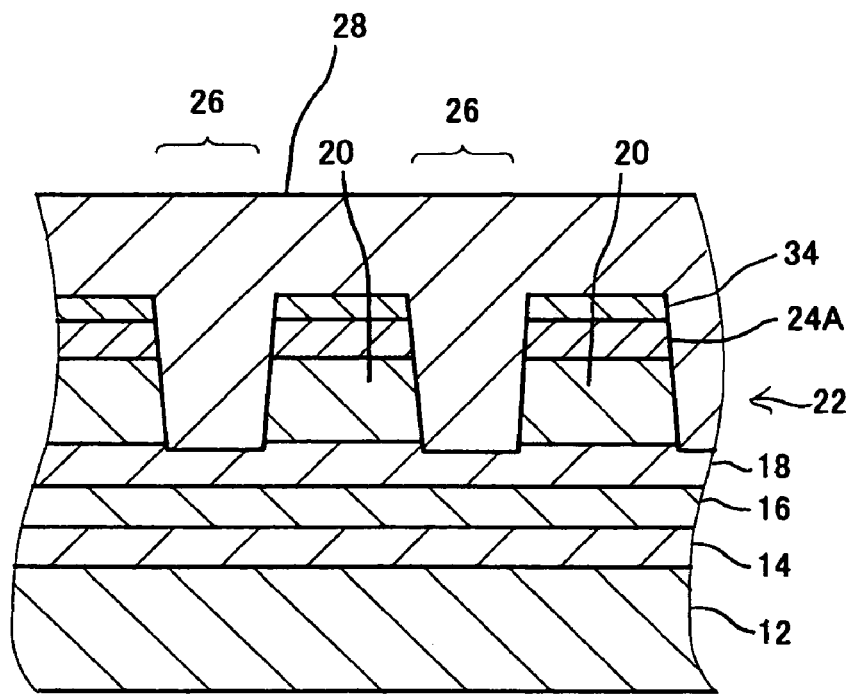
FIG. 7 is a side sectional view schematically showing the shape of the intermediate product in which gaps have been filled with a non-magnetic material.

The continuous recording layer 32 is then removed from the bottom of the concave parts by the reactive ion etching using CO gas with added $NH_3$ gas as the reactive gas, so that the continuous recording layer 32 is divided into a number of minute recording elements 20. As a result, the divided recording layer 22 as shown in FIG. 6 is formed (S108). During this process, the seed layer 18 is also removed from the bottom of the concave parts in a small amount. The second mask layer 36 in the region other than the concave parts is completely removed, while the first mask layer 34 in the region other than the concave parts is left in a small amount over each of the divided recording elements 20. Next, as shown in FIG. 7, gaps 26 between the divided recording elements 20 are filled with a non-magnetic material 28 by a sputtering deposition method with bias power to the substrate (S109). In this process, the non-magnetic material 28 is deposited so as to cover completely the divided recording elements 20 and the gaps 26.

Figure 8:
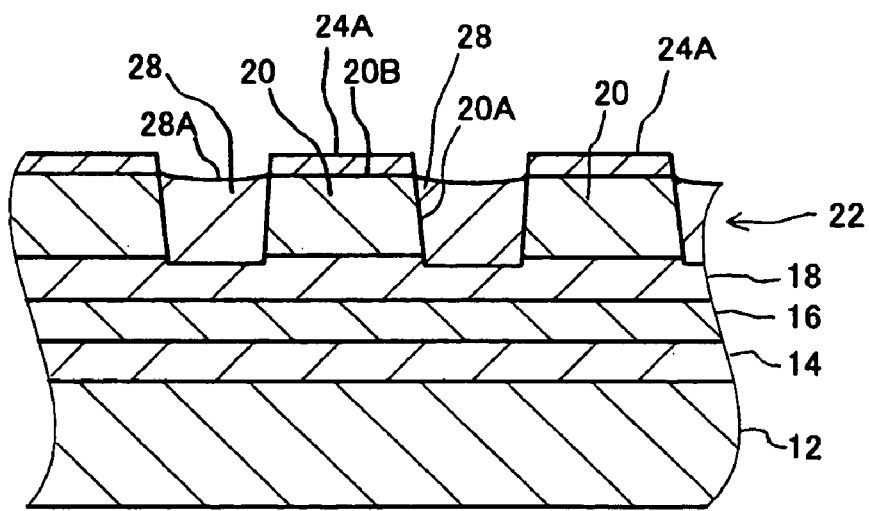
FIG. 8 is a side sectional view schematically showing the shape of the intermediate product the surface of which has been flattened.

Then, an excess of the non-magnetic material 28 is removed from over the gaps 26, together with the first mask layer 34 left over the divided recording elements 20, by a CMP method, so that the surface is flattened as shown in FIG. 8 (S110). During this process, since the intermediate protective layer 24A made of DLC serves as a mask, and the non-magnetic material 28 of $SiO_2$ is removed slightly faster than the intermediate protective layer 24A, the surface of the non-magnetic material 28 becomes situated slightly lower than the surface of the divided recording elements 20 in the thickness direction.

Additionally, during this process, since the divided recording elements 20 are covered at the top face 20A with the intermediate protective layer 24A and at the side face 20B with the non-magnetic material 28, the divided recording elements 20 are completely separated from slurry or other material used in the CMP method and hence will not be deteriorated by oxidation or corrosion that might be caused by such materials.

Next, a surface protective layer 24B is formed over the divided recording elements 20 and the non-magnetic material 28 by a CVD method (S111). The surface protective layer 24B is formed such that the surface thereof becomes smoother compared to the steps between the divided recording elements 20 and the non-magnetic material 28.

As a result, the magnetic recording medium 10 as shown in FIG. 1 is obtained.

If required, a lubricant layer of PEPE (perfluoropolyether) for example may be applied to a thickness of 10 to 20 Å on the surface of the protective layer 24, by a dipping method.

As described in the above, since the intermediate protective layer 24A is formed between the continuous recording layer 32 and the first mask layer 34, the intermediate protective layer 24A separates the top face of the continuous recording layer 32 at all times from the atmosphere, reactive gas or the like, and hence the deterioration in the region around the top face 20A can be prevented effectively. Further, also after the continuous recording layer 32 has been divided, the intermediate protective layer 24A still separates the top face 20A of the divided recording elements 20 from slurry or the like, so that the deterioration in the region around the top face 20A can be prevented reliably.

Further, since the first mask layer 34 is removed after the gaps 26 between the divided recording elements 20 are filled with the non-magnetic material 28, the non-magnetic material 28 separates the side face 20B of the divided recording elements 20 from slurry or the like during the removal of the first mask layer 34, and hence the deterioration in the region around the side face 20B can also be prevented.

Still further, since the first mask layer 34 is removed by employing the CMP method that is highly efficient in processing, the aforementioned manufacturing process exhibits high production efficiency.

In addition, since the step of removing the first mask layer 34 serves also as a step of flattening the surface, the production efficiency of the aforementioned manufacturing process is improved still further.

Further, by forming the intermediate protective layer 24A on the top face 20A of the divided recording elements 20, it is made possible to remove the non-magnetic material 28 slightly faster than the intermediate protective layer 24A by utilizing the CMP method and thus to process the non-magnetic material 28 efficiently such that the surface of the non-magnetic material 28 is slightly lower than the surface of the divided recording elements 20 in the thickness direction.

It should be noted that, although in the foregoing exemplary embodiment the divided recording layer 22 (and the continuous recording layer 32) is formed of Co alloys including Co and CoCrPt, the present invention is not limited thereto and the divided recording layer 22 (and the continuous recording layer 32) may be formed of other materials such as a laminate of the Co alloys, Fe (iron), an Fe alloy, and a laminate of the Fe alloys.

Further, although in the foregoing exemplary embodiment the first mask layer 34 is formed from TiN, the material of the first mask layer 34 is not limited particularly to this and any other material such as Ti (titanium), Ta (tantalum), Mg (magnesium), Al (aluminum), Si (silicon), Ge (germanium), Pb (lead), or an alloy or compound containing such element as the principal component may be used so far as it is difficult to remove by the reactive ion etching using CO gas or the like as the reactive gas.

Further, although in the foregoing exemplary embodiment the second mask layer 36 of a negative-type resist is further formed on the first mask layer 34 for patterning the first mask layer 34 into a predetermined pattern by the dry etching, and the first mask layer 34 is processed into the predetermined pattern by the two dry etching steps, the present invention is not limited to this. So far as the first mask layer 34 can be processed into the predetermined pattern, the number or the material of additional mask layer(s) formed on the first mask layer 34 is not limited particularly, and it is also possible to process the first layer 34 into the predetermined pattern for example by three or more dry etching steps.

Still further, although in the foregoing exemplary embodiment the reactive ion etching that uses $CF_4$ or $SF_6$ as the reactive gas is employed for processing the first mask layer 34, the present invention is not limited to this, and the type of the reactive gas is not limited particularly so far as it reacts with the material of the first mask layer 34 to accelerate the etching process. For example, other types of fluorine-based gas such as $NF_3$ or $CHF_3$, or chlorine-based gas such as $Cl_2$, $BCl_3$, or $CHCl_3$ may be used. The same is applicable to the mask layer removing processes.

In addition, although in the foregoing exemplary embodiment the gaps 26 between the divided recording elements 20 are filled with the non-magnetic material 28 by using the sputtering deposition method with bias power to the substrate, the present invention is not limited to this, and the deposition of the non-magnetic material may be performed by the plasma CVD method with bias power to the substrate.

Further, although in the foregoing exemplary embodiment the CMP method is employed for removing the first mask layer 34 and an excess of the non-magnetic material 28 and flattening the surface, the present invention is not limited to this, and the first mask layer 34 and the excessive non-magnetic material 28 may be removed to flattened the surface by employing a drying etching method using plasma, such as ion beam etching, ion milling, or reactive ion etching.

Further, although in the foregoing exemplary embodiment the intermediate protective layer 24A serves as a "mask" for removing the non-magnetic material 28 selectively so that the surface of the non-magnetic material 28 is situated lower than the surface of the divided recording elements 20 in the thickness direction, the present invention is not limited to this. It is also possible to process the non-magnetic material by selecting appropriate materials for the first mask layer, non-magnetic material, and slurry such that the non-magnetic material is removed slightly faster than the first mask layer and the first mask layer serves as a mask, and thus removing the non-magnetic material selectively so that the surface of the non-magnetic material is situated lower than the surface of the divided recording elements in the thickness direction.

On the other hand, it is also possible to process the non-magnetic material by selecting appropriate materials for the first mask layer, non-magnetic material, and slurry such that the non-magnetic material is removed slightly more slowly than the first mask layer, so that the surface of the non-magnetic material is situated higher than the surface of the divided recording elements in the thickness direction.

Further, if sufficiently good magnetic properties can be obtained, the surface of the divided recording element 20 may be formed flush with the surface of the non-magnetic material 28 without any step.

Further, although in the foregoing exemplary embodiment the surface protective layer 24B is additionally formed over the intermediate protective layer 24A and the non-magnetic material 28, the present invention is not limited to this. The surface protective layer 24B may be omitted if the step height between the intermediate protective layer 24A and the non-magnetic material 28 is small enough to ensure the stable flying of the head. Also in this case, since the divided recording elements 20 are separated from the atmosphere or the like by the intermediate protective layer 24A and the non-magnetic material 28, the deterioration of the divided recording elements 20 can be prevented effectively.

Further, according to the foregoing exemplary embodiment, the intermediate protective layer 24A is formed between the continuous recording layer 32 and the first mask layer 34, the continuous recording layer 32 is divided, and then the gaps 26 between the divided recording elements 20 are filled with the non-magnetic material 28 before removing the first mask layer 34. However, the present invention is not limited to this, and it is also possible to remove the first mask layer 34 before filling the gaps 26 between the divided recording elements 20 with the non-magnetic material 28. In this case also, if the intermediate protective layer 24A is formed between the continuous recording layer 32 and the first mask layer 34, the top face 20A of the divided recording elements 20 (and the top face of the continuous recording layer 32) can be separated from the atmosphere, reactive gas, slurry or the like, and hence an effect of preventing the deterioration of the divided recording elements 20 can be expected to a certain extent.

On the other hand, in a case where the first mask layer 34 is formed directly on the continuous recording layer 32 while omitting the intermediate protective layer 24A, the side face 20B of the divided recording elements 20 can be separated from the atmosphere, reactive gas, slurry or the like if the first mask layer 34 is removed after the gaps 26 between the divided recording elements 20 are filled with the non-magnetic material 28, and hence an effect of preventing the deterioration of the divided recording elements 20 can be obtained to a certain extent.

Further, in the foregoing exemplary embodiment, the magnetic recording medium 10 is a magnetic disc of a discrete, vertical recording type in which the divided recording elements 20 are juxtaposed along the radial direction of the tracks at small intervals. However, the present invention is not limited to this embodiment, and, naturally, it is also applicable to the manufacture of a magnetic disc in which divided recording elements are juxtaposed in the circumferential direction of tracks (in the direction of sectors) at small intervals, a magnetic disc in which divided recording elements are juxtaposed in both the radial and circumferential directions of tracks at small intervals, and a magnetic disc in which divided recording elements are formed spirally. Additionally, the present invention is also applicable to the manufacture of a magneto-optical disc (MO) or the like, and also of a discrete-type magnetic recording medium with a shape other than a disc, such as magnetic tape or the like.

EXAMPLE

A magnetic recording medium 10 was produced according to the aforementioned embodiment, and left stand for 48 hours in a high-temperature and high-humidity environment with a temperature of 80° C. and a humidity of 80%.

Figure 9:
FIG. 9 is an optical microscopic photograph showing an enlargement of the surface of the magnetic recording medium according to an example of the embodiment of the present invention.

FIG. 9 is an optical microscopic photograph showing an enlargement of the surface of the magnetic recording medium 10 that has been left stand for 48 hours in the high-humidity environment. No defect such as corrosion was found on the surface of the magnetic recording medium 10 either immediately after the production thereof or after 48 hours standing in the high-humidity environment.

Figure 10:
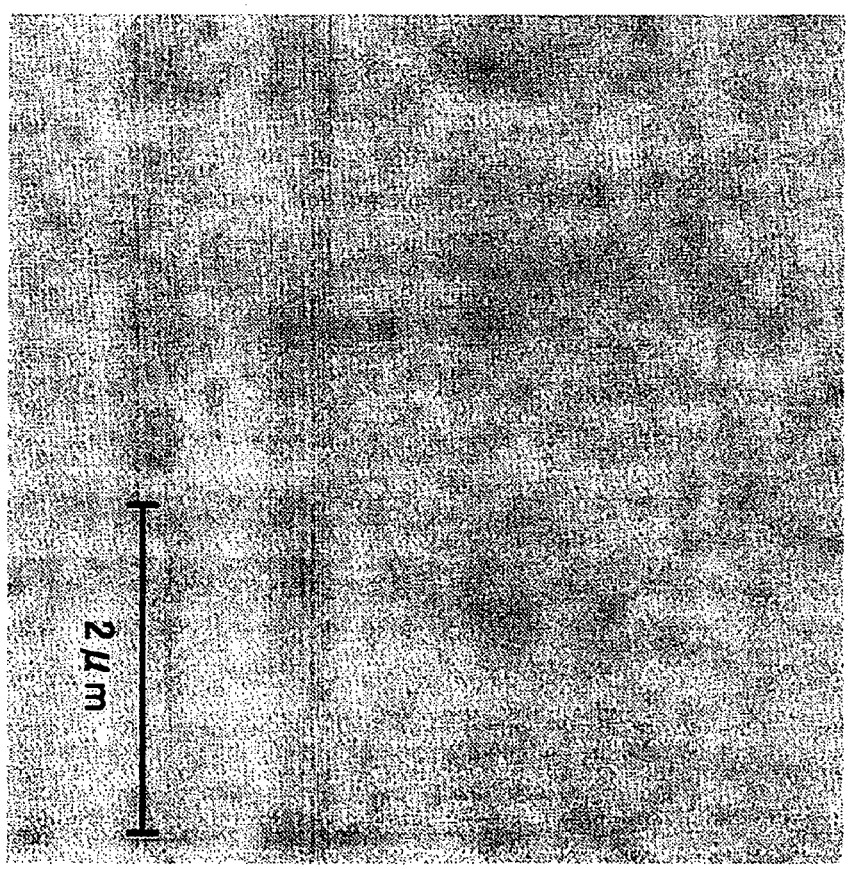
FIG. 10 is an atomic force microscopic photograph showing a further enlargement of the surface of the magnetic recording medium of FIG. 9.

FIG. 10 is an atomic force microscopic photograph showing a further enlargement of the surface of the magnetic recording medium 10 immediately after the production. Measurements of the surface roughness and maximum recess of the magnetic recording medium 10 found the following results.

Surface roughness Ra=0.715 nm
Maximum recess=2.82 nm

Figure 11:
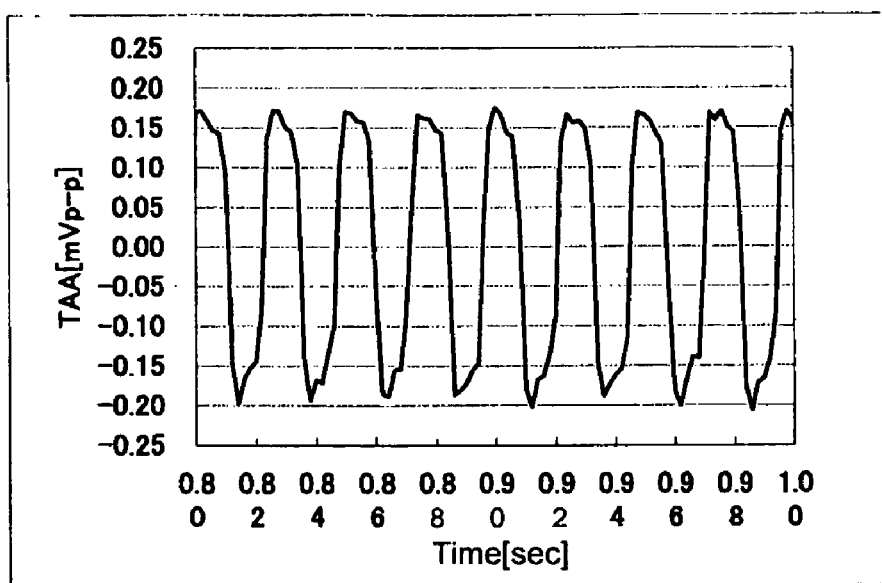
FIG. 11 is a graph showing the electromagnetic conversion property of the magnetic recording medium according to the example of the embodiment of the present invention.

The electromagnetic conversion property of the magnetic recording medium 10 was measured, and it was confirmed that, as shown in FIG. 11, the waveform was stable and the electromagnetic conversion property was favorable.

Comparative Example

To compare with the aforementioned embodiment, a comparative sample was produced by a method in which a first mask layer 34 was formed directly on a continuous recording layer 32, omitting an intermediate protective layer 24A. The continuous recording layer 32 was divided into divided recording elements 20, and then the first mask layer 34 left on the top of the divided recording elements 20 was removed by the reactive ion etching using $SF_6$ gas as a reactive gas, before filling gaps 26 between the divided recording elements 20 with a non-magnetic material 28. All the other conditions were the same as the foregoing example. The comparative sample thus produced was left stand for 48 hours in a high-humidity environment in a similar manner to the example above.

Figure 12:
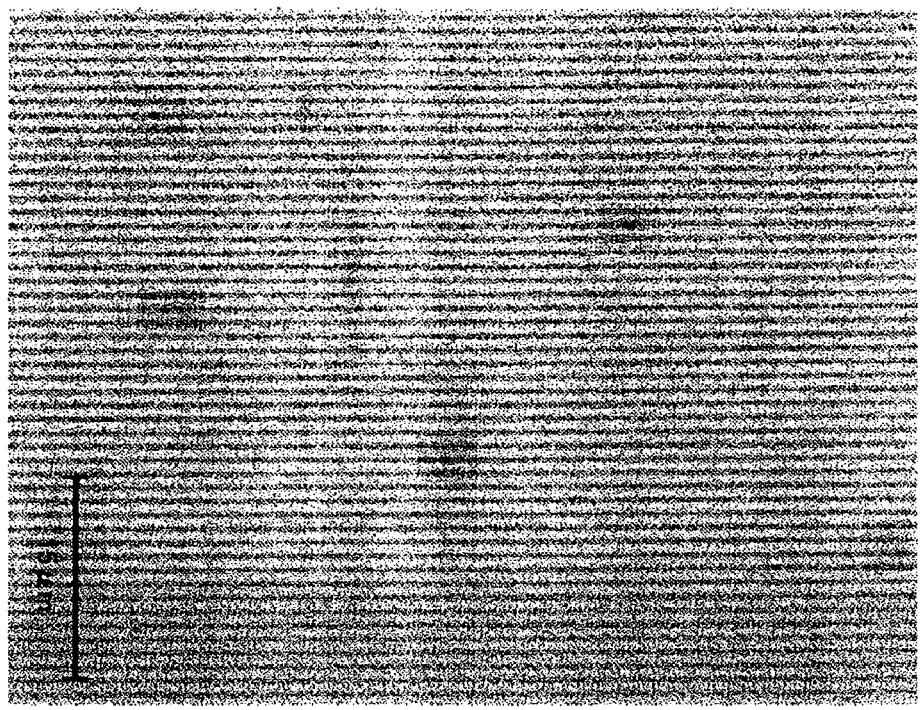
FIG. 12 is an optical microscopic photograph showing an enlargement of the surface of a comparative example.

FIG. 12 is an optical microscopic photograph showing an enlargement of the surface of the comparative sample after the 48 hours standing in the high-humidity environment. Although no defect such as corrosion was found on the surface of the comparative material immediately after the production, a large number of corrosions were observed in the areas around the gaps between the divided recording elements of the comparative sample after 48 hours standing in the high-humidity environment.

Figure 13:
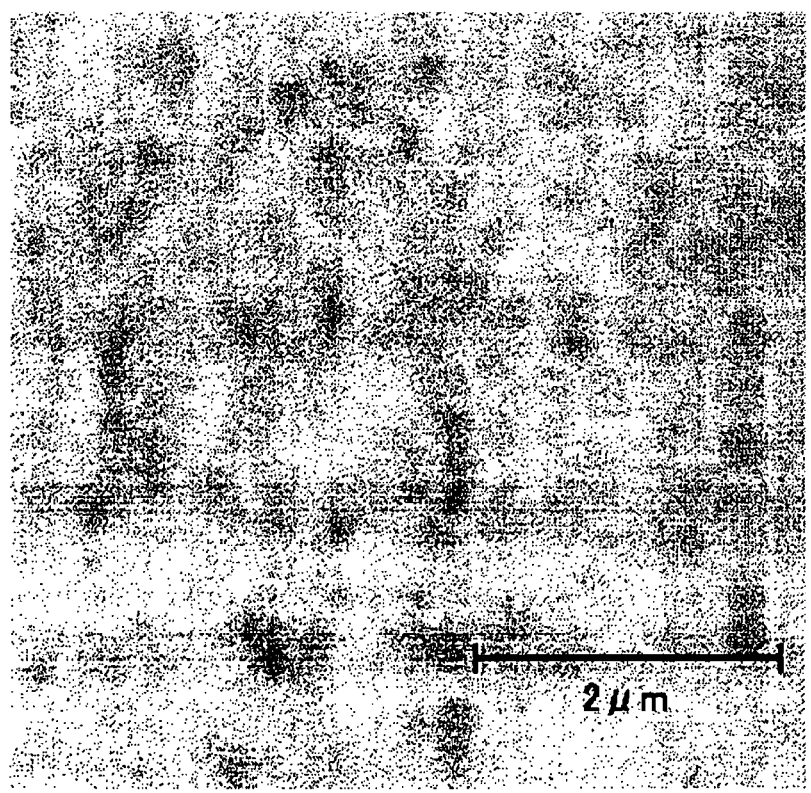
FIG. 13 is an atomic force microscopic photograph showing a further enlargement of the surface of the comparative example.

FIG. 13 is an atomic force microscopic photograph showing a further enlargement of the surface of the comparative sample immediately after the production. Measurements of the surface roughness and maximum recess of the comparative sample found the following results.

Surface roughness Ra=0.724 nm
Maximum recess=2.86 nm

Figure 14:
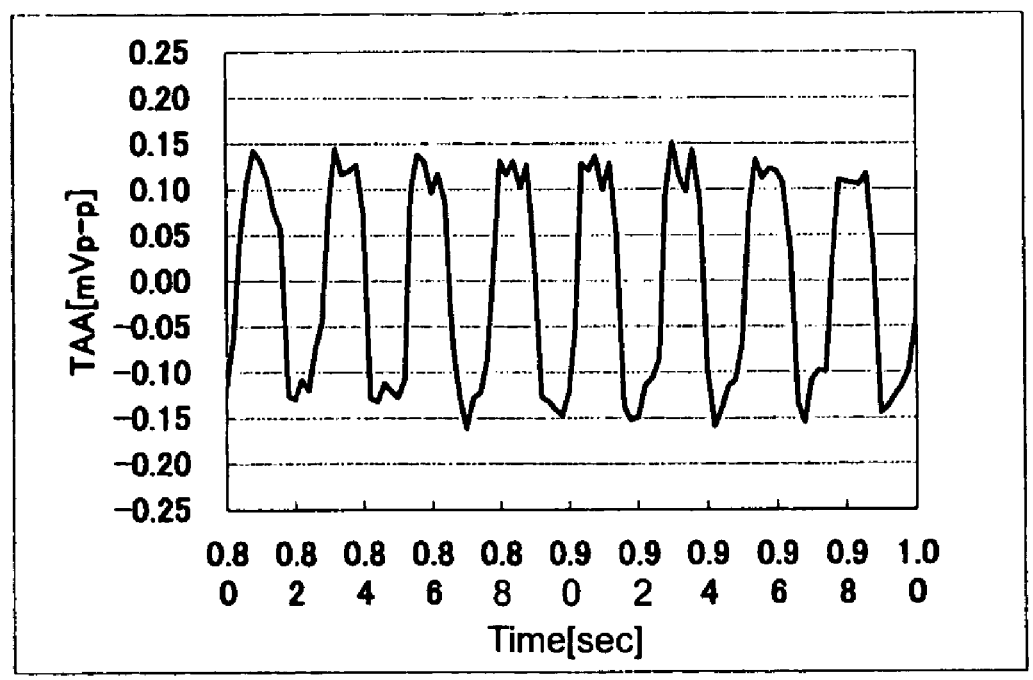
FIG. 14 is a graph showing the electromagnetic conversion property of the comparative example.

The electromagnetic conversion property of the comparative sample was measured. As a result, as shown in FIG. 14, noises were found around the peaks of the waveforms, and it was confirmed that the electromagnetic conversion property was not favorable.

In conclusion, it was confirmed that, in the example, the corrosion of the divided recording elements was prevented effectively. It was also confirmed that the electromagnetic conversion property was more favorable in comparison with the comparative example. Further, there was no significant difference in surface roughness or maximum recess between the example and comparative example.

As described in the above, according to various exemplary embodiments of the invention, the following excellent effects can be obtained. That is, it is made possible to manufacture a magnetic recording medium, in a reliable manner, that is capable of preventing its divided recording elements from deterioration assuredly, and affords a high surface recording density and high recording/reading performance.

What is claimed is:

1. A method for manufacturing a magnetic recording medium comprising:
   a continuous recording layer formation step of forming a continuous recording layer on a surface of a substrate;
   an intermediate protective layer formation step of forming an intermediate protective layer on the continuous recording layer;
   a mask layer formation step of forming a mask layer on the intermediate protective layer;
   a mask layer processing step of partially removing the mask layer in a predetermined pattern;
   a continuous recording layer processing step of removing a part of the continuous recording layer exposed from the mask layer to divide the continuous recording layer into a number of divided recording elements in the predetermined pattern; and
   a mask layer removing step of removing the mask layer on the top of the intermediate protective layer while leaving the intermediate protective layer on the top of each of the divided recording elements,
   the continuous recording layer processing step and the mask layer removing step being performed in this order.

2. The method for manufacturing a magnetic recording medium according to claim 1, wherein
   in the intermediate protective layer formation step, a thin film layer of diamond-like carbon is formed as the intermediate protective layer.

3. The method for manufacturing a magnetic recording medium according to claim 2, wherein
   in the intermediate protective layer formation step, the thin film layer of diamond-like carbon is formed by using a CVD method.

4. The method for manufacturing a magnetic recording medium according to claim 1, wherein
   a non-magnetic material filling step of filling gaps between the divided recording elements with a non-magnetic material is provided between the continuous recording layer processing step and the mask layer removing step.

5. The method for manufacturing a magnetic recording medium according to claim 2, wherein
   a non-magnetic material filling step of filling gaps between the divided recording elements with a non-magnetic material is provided between the continuous recording layer processing step and the mask layer removing step.

6. The method for manufacturing a magnetic recording medium according to claim 3, wherein
   a non-magnetic material filling step of filling gaps between the divided recording elements with a non-magnetic material is provided between the continuous recording layer processing step and the mask layer removing step.

7. A method for manufacturing a magnetic recording medium comprising:
   a continuous recording layer formation step of forming a continuous recording layer on a surface of a substrate;
   a mask layer formation step of forming a mask layer on the continuous recording layer;
   a mask layer processing step of partially removing the mask layer in a predetermined pattern;
   a continuous recording layer processing step of removing a part of the continuous recording layer exposed from the mask layer to divide the continuous recording layer into a number of divided recording elements in the predetermined pattern;
   a non-magnetic material filling step of filling gaps between the divided recording elements with a non-magnetic material; and
   a mask layer removing step of removing the mask layer remaining on the divided recording elements,
   the continuous recording layer processing step, the non-magnetic material filling step, and the mask layer removing step being performed in this order.

8. The method for manufacturing a magnetic recording medium according to claim 4, wherein
   in the non-magnetic material filling step, the gaps between the divided recording elements are filled with the non-magnetic recording material deposited by any one of a plasma CVD method with bias power to the substrate and a sputtering deposition method with bias power to the substrate.

9. The method for manufacturing a magnetic recording medium according to claim 7, wherein
   in the non-magnetic material filling step, the gaps between the divided recording elements are filled with the non-magnetic recording material deposited by any one of a plasma CVD method with bias power to the substrate and a sputtering deposition method with bias power to the substrate.

10. The method for manufacturing a magnetic recording medium according to claim 8, wherein
    in the non-magnetic material filling step, a material containing one selected from the group consisting of an oxide material, a nitride material, and a non-magnetic amorphous material is used as the non-magnetic material.

11. The method for manufacturing a magnetic recording medium according to claim 9, wherein
    in the non-magnetic material filling step, a material containing one selected from the group consisting of an oxide material, a nitride material, and a non-magnetic amorphous material is used as the non-magnetic material.

12. The method for manufacturing a magnetic recording medium according to claim 4, wherein
    in the mask layer removing step, the surface is flattened by removing an excess of the non-magnetic material from over the gaps together with the mask layer remaining over the divided recording elements.

13. The method for manufacturing a magnetic recording medium according to claim 7, wherein
    in the mask layer removing step, the surface is flattened by removing an excess of the non-magnetic material from over the gaps together with the mask layer remaining on the divided recording elements.

14. The method for manufacturing a magnetic recording medium according to claim 12, wherein
    in the mask layer removing step, the surface is processed so as to create a step between the surface of the non-magnetic material and the surface of the divided recording elements in the thickness direction, by removing an excess of the non-magnetic material from over the gaps together with the mask layer remaining over the divided recording elements.

15. The method for manufacturing a magnetic recording medium according to claim 13, wherein in the mask layer removing step, the surface is processed so as to create a step between the surface of the non-magnetic material and the surface of the divided recording elements in the thickness direction, by removing an excess of the non-magnetic material from over the gaps together with the mask layer remaining on the divided recording elements.

16. The method for manufacturing a magnetic recording medium according to claim 12, wherein in the mask layer removing step, the surface is processed so as to create a step height of −15 to +10 nm between the surface of the non-magnetic material and the surface of the divided recording elements in the thickness direction, by removing an excess of the non-magnetic material from over the gaps together with the mask layer remaining over the divided recording elements.

17. The method for manufacturing a magnetic recording medium according to claim 13, wherein in the mask layer removing step, the surface is processed so as to create a step height of −15 to +10 nm between the surface of the non-magnetic material and the surface of the divided recording elements in the thickness direction, by removing an excess of the non-magnetic material from over the gaps together with the mask layer remaining on the divided recording elements.

* * * * *